(12) United States Patent
Oetting et al.

(10) Patent No.: US 8,424,513 B2
(45) Date of Patent: Apr. 23, 2013

(54) METHOD FOR THE PRODUCTION OF AN ABSORBER PLATE FOR SOLAR COLLECTORS

(75) Inventors: Wolf Oetting, San Jose, CA (US); Willi Schenkel, Grevenbroich (DE); Volker Denkmann, Kempen (DE); Andreas Siemen, Jüchen (DE); Merete Hallenstvet, Tønsberg (NO); Axel Blecher, Niederkassel (DE); Bente Gilbu Tilset, Bekkestua (NO); Anica Lacau, Holmestrand (NO); Christian Rone Simon, Oslo (NO)

(73) Assignee: Hydro Aluminium Deutchland GmbH, Köeln (DE)

( * ) Notice: Subject to any disclaimer, the term of this patent is extended or adjusted under 35 U.S.C. 154(b) by 596 days.

(21) Appl. No.: 12/438,663

(22) PCT Filed: Aug. 24, 2007

(86) PCT No.: PCT/EP2007/058809
§ 371 (c)(1),
(2), (4) Date: Feb. 22, 2010

(87) PCT Pub. No.: WO2008/023054
PCT Pub. Date: Feb. 28, 2008

(65) Prior Publication Data
US 2010/0236543 A1    Sep. 23, 2010

(30) Foreign Application Priority Data
Aug. 25, 2006 (DE) .................. 10 2006 039 804

(51) Int. Cl.
*F24J 2/48*  (2006.01)

(52) U.S. Cl.
USPC .......... 126/650; 126/714; 126/666; 428/596; 428/344; 427/428.01

(58) Field of Classification Search ................ 126/650, 126/714; 427/428.01
See application file for complete search history.

(56) References Cited

U.S. PATENT DOCUMENTS

| 4,153,753 | A |   | 5/1979  | Woodman et al. ........... 148/531 |
|-----------|---|---|---------|-----------------------------------|
| 4,161,809 | A | * | 7/1979  | Severson ................ 29/890.033 |
| 4,277,537 | A |   | 7/1981  | Woodman .................... 428/409 |
| 4,287,266 | A | * | 9/1981  | Myles ............................. 428/596 |
| 4,416,916 | A | * | 11/1983 | Aykan et al. .................. 427/160 |

(Continued)

FOREIGN PATENT DOCUMENTS

| DE | 36 15 181 A | 2/1987 |
| DE | 196 10 015  | 9/1997 |

(Continued)

OTHER PUBLICATIONS

International Search Report for International Application No. PCT/EP2007/058809, Dec. 20, 2007.

(Continued)

*Primary Examiner* — Avinash Savani
(74) *Attorney, Agent, or Firm* — Proskauer Rose LLP

(57) ABSTRACT

A method for the production of an absorber plate for solar collectors from a strip of metal, in particular of aluminum or an aluminum alloy, includes coating the strip using a coil coating process with a highly selective coating, which has very good absorptive properties for sunlight and ensures very little heat emission.

15 Claims, 1 Drawing Sheet

U.S. PATENT DOCUMENTS

| | | | |
|---|---|---|---|
| 5,288,356 A | 2/1994 | Benefiel | |
| 5,912,045 A | 6/1999 | Eisenhammer et al. | |
| 6,632,542 B1 * | 10/2003 | Mahoney et al. | 428/632 |
| 2004/0233530 A1 | 11/2004 | Kramer et al. | 359/507 |
| 2005/0189525 A1 * | 9/2005 | Kuckelkorn et al. | 252/582 |
| 2006/0154049 A1 * | 7/2006 | Padiyath et al. | 428/328 |

FOREIGN PATENT DOCUMENTS

| | | |
|---|---|---|
| DE | 201 12 259 | 3/2002 |
| DE | 20 2005 006 478 U | 7/2005 |
| DE | 20 2006 009369 | 10/2007 |
| FR | 2 805 283 | 8/2001 |
| GB | 2 094 666 | 9/1982 |
| SU | 4 489 70 A | 11/1974 |
| SU | 1 617 268 A | 12/1990 |
| SU | 1 772 257 A | 10/1992 |

OTHER PUBLICATIONS

English language translation of German Application: DE 196 10 015 (B1), Sep. 18, 1997.

English language translation of German Application: DE 20 2006 009 369 U1 (B5), Nov. 22, 2007.

English language translation of German Application: DE 201 12 259 (B2), Nov. 4, 2002.

Orel et al., FTIR spectroscopic investigations and the thermal stability of thickness sensitive spectrally selective (TSSS) paint coatings, Solar Energy Materials, 1991, pp. 259-79, vol. 22, Elsevier Science Publishers B.V.

Orel et al., Thickness sensitive spectrally selective (TSSS) paint for solar collectors : optical properties, surface characterization and application properties, Solar Energy Materials, 1988, pp. 97-107, vol. 18, Elsevier Science Publishers B.V.

Gunde et al., The influence of paint dispersion parameters on the spectral selectivity of black-pigmented coatings, Solar Energy Materials & Solar Cells, 2003, pp. 239-45, vol. 80, Elsevier B.V.

Kittel, Lehrbuch der Lacke und Beschichtungen: VII (Eng. Trans.: Textbook of Varnishes and Coatings: VII), 1979, pp. 33-37, Berlin und Oberschwandorf, W.A. Colomb.

* cited by examiner

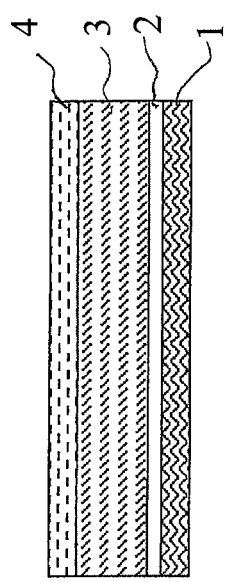

METHOD FOR THE PRODUCTION OF AN ABSORBER PLATE FOR SOLAR COLLECTORS

CROSS-REFERENCE TO RELATED APPLICATIONS

This application is a National Phase Application of International Application No. PCT/EP2007/058809, filed on Aug. 24, 2007, which claims the benefit of and priority to German patent application no. DE 10 2006 039 804.1-45, filed on Aug. 25, 2006. The disclosures of the above applications are incorporated herein by reference in their entirety.

FIELD OF THE INVENTION

The invention relates to a method for the production of an absorber plate for solar collectors made from a strip of metal, in particular of aluminum or an aluminum alloy. Furthermore the invention relates to an absorber plate for solar collectors as well as an advantageous use of the absorber plate.

BACKGROUND

Solar collectors are devices for recovering heat from solar radiation. A solar collector traps and absorbs the energy contained in sunlight, whereby in contrast to photovoltaic systems almost the entire radiation spectrum of the sunlight is used with high efficiency. The most important component of the panel is the absorber, which transforms the light energy of the sun into heat and the latter is conducted to a heat carrier medium flowing through it. The absorber is usually realized by means of an absorber plate, which is designed to catch direct and diffuse solar radiation as well as possible and convert the latter into heat. Frequently the absorber plate, which includes a copper alloy or aluminum alloy, must also ensure that the heat absorbed does not escape again in the form of heat emission. In order to minimize the energy losses through emission of radiant heat by the absorber plate, the latter has a so-called highly selective coating. Typically absorption values for sunlight of the highly selective coating amount to about 94% and emission values to less than 6%. The highly selective coatings consist of extremely thin coats, which are usually produced by a "physical vapor deposition" (PVD) process or a "chemical vapor deposition" (CVD) process. In the PVD process a strip is fed, via air-lock systems, into a vacuum coating machine and there it passes several cathodes, connected one behind the other, on which the coating material is assembled as target. Particles are driven out from the target, consisting of coating material, by accelerated argon ions and settle on the surface of the metallic strip, forming a permanent bond with the latter. Subsequently, the strip is locked out from the vacuum and coiled up. Although small thicknesses can be obtained with the prior art process, the capital outlay for PVD or CVD installations is very high. This is reflected in the cost of the absorber plate.

SUMMARY OF THE INVENTION

In general, one aspect of the present invention is to provide a method for the production of an absorber plate for solar collectors, wherein an absorber plate with a highly selective coating can be produced economically. Another aspect of the present invention is to propose an absorber plate, which can be produced economically.

In accordance with a first teaching of the present invention, a method includes painting a strip using a coil coating process, with a highly selective coating, which has very good absorptive properties for sunlight and ensures very little heat emission.

It turns out that by using the coil coating process very thin coatings can be uniformly applied to a strip, so that a highly selective coating, having correspondingly thin coats, can be applied on a strip for the production of absorber plates. In contrast to the methods used up till now, no high capital outlay is necessary for the method according to the invention, since in particular air-lock systems to enter and leave a vacuum are not necessary to coat the strip. The strip can then be wound for example first on a coil and cut to length later. However, it is also conceivable to cut the strip to length directly after coil coating.

In accordance with a first advantageous embodiment of the method according to the invention the coating is applied using at least one roller coater. The coating thickness can be adjusted very exactly by means of the gravure on the roller coaters and for example by means of their relative speed to the strip. In addition, other methods of painting the strip are also conceivable, for example powder coating or spraying of the strip surface.

Preferably a plurality of functional coats is applied in the coil coating process, so that the characteristics of the highly selective coating can be adapted by selecting different functional coats.

The thicknesses of the individual functional coats are between 0.0005 and 0.02 mm.

In accordance with another further embodiment of the method according to the invention for the production of an absorber plate, an adhesion promoter coat or primer coat is applied to the strip surface, which is preferably coated in a pretreatment. The adhesion properties of the strip surface are substantially improved for subsequent functional coats by means of the adhesion promoter coat or the primer coat respectively. The adhesion promoter coat but also the primer coat is preferably coated in a pretreatment, so that application of the highly selective coating is not disturbed by the application of the adhesion promoter coat or primer coat. Furthermore, the improved adhesion properties of the strip surface can be exploited when the other coats are applied. Also the adhesion promoter coat, already at this stage, can be interpreted as a functional (highly selective) coat.

If the applied coats contain functional particles, in particular nano-particles, metal particles, metallic oxide particles and/or pigments, different functions can be implemented by the individual applied coats. For example, in this way anti-reflective characteristics or absorptive properties of a coat can be determined by the selection of the functional particles.

Particularly small thicknesses can be obtained if one or more coats are applied on a sol-gel basis. If a coating on a sol-gel basis is used, first a liquid sol-film is applied, which after a short drying time transforms into a solid gel-film. The organic components of the metal-organic polymer are then removed by further thermal treatment, so that for example a metallic oxide film remains on the surface. For example this technique can be used for the production of an absorbent coat by depositing titanium dioxide particles on the strip surface or for the application of an anti-reflective coating by depositing a silicon dioxide film on the strip. The coat thicknesses obtained can be very small in this case. At the same time, the functionality of particles can only be produced by the drying process.

Finally, further advantages result due to the applied coating having at least partial flexible characteristics. In this case it is also possible, after coating, to provide the absorber plate with embossings, in order to increase the absorbent surface without tears developing in the coating.

In accordance with a second teaching of the present invention an absorber plate includes a highly selective coating, applied using a coil coating process, for improvement of the absorptive properties.

As already stated above, the coating, applied using the coil coating process, can be produced substantially more economically than in the case of the previously necessary PVD or CVD processes, since capital outlay for the cost-intensive vacuum technology is dispensed with and considerably higher coating speeds can be achieved.

A further cost and weight advantage can be obtained with the absorber plate according to the invention in accordance with another further embodiment due to the absorber plate being comprised of aluminum or an aluminum alloy. Aluminum has a substantially lighter weight relative to copper with similar heat conductivity characteristics. Furthermore aluminum is substantially more economical as a material than copper.

An absorber plate, optimized as regards its absorptive properties, can also be made available due to the highly selective coating consisting of several functional coats, whereby one or more of the several functional coats include functional particles, in particular nano-particles, metal particles, metallic oxide particles and/or pigments. As a result it is possible to optimize the individual coats with a view to their function by selection of the functional particles. For example, a functional coat can have the characteristic that it absorbs short-wave solar radiation and at the same time is transparent for long-wave radiant heat. As a result, conduction of the short-wave solar radiation converted into long-wave radiant heat is achieved, so that the absorber plate is heated up accordingly. At the same, time the outside coats can be reflective for radiant heat, so that the absorbent coat emits hardly any radiant heat to the outside. Further functions are also surface protection against corrosion, for example through humidity and temperature resistance, or adhesion promoter properties, which substantially improve the coating of the metallic substrate.

The thicknesses of said functional coats on the absorber plate are preferably between 0.0005 and 0.02 mm.

As already stated above, an absorber plate with improved adhesion properties for functional coats can be made available due to an adhesion promoter coat or a primer coat being provided.

Particularly small thicknesses can be made available with another embodiment of the absorber plate according to the invention due to at least one functional coat on a sol-gel basis, being provided The heat absorptive properties of the inventive absorber plate can also be further improved if the absorber plate is provided with embossings before or after coating. The surface of the plate available for absorption is increased by the embossings.

In accordance with a further embodiment the absorber plate according to the invention can be used as a solar collector, in particular for flat plate collector. The economically produced absorber plate, as already explained, can contribute to a substantial reduction in the costs of the solar collectors or, respectively, solar panels while maintaining the same efficiency.

DESCRIPTION OF THE DRAWING

The single drawing (FIG. 1) shows a schematic sectional view of the surface of an exemplary embodiment of an absorber plate according to the invention.

FIG. 1 shows the surface of the absorber plate 1, which has a coating comprised in total of three functional coats 2, 3, 4. The functional coat 2 in this case is constructed as an adhesion promoter coat or primer coat and preferably already applied to the strip surface in a pretreatment. The functional coat 3 in the case of the exemplary embodiment illustrated in FIG. 1 of the absorber plate according to the invention consists of an absorbent coat on a sol-gel basis, which has nano-particles, for example titanium nitrite or titanium dioxide particles. The absorbent coat 3 is preferably transparent for long-wave radiant heat and therefore enables the heat energy to be conducted to the surface of the absorber plate 1 by converting the short-wave solar radiation into long-wave solar radiation. The anti-reflective coat 4 based on a sol-gel basis, likewise applied by means of a coil coating process, allows the reflective coefficient of the coated absorber plate to be very low, since the refractive index is adjusted by the anti-reflective coating. As a result the absorption of sunlight is likewise increased. All said functional coats 2, 3, 4 are applied according to the invention by means of a coil coating process, wherein preferably roller coaters are used. The sol-gel coats can be applied in a simple manner by these roller coaters. However, different application methods in the coil coating process are also conceivable, for example the use of spray equipment or powder coating.

Variations, modifications, and other implementations of what is described herein will occur to those of ordinary skill without departing from the spirit and the scope of the invention. Accordingly, the invention is not to be defined only by the preceding illustrative description.

The invention claimed is:

1. Method for the production of an absorber plate for solar collectors from a strip made of metal, wherein the strip, using a coil coating process, is painted with a highly selective coating, which has very good absorptive properties for sunlight and ensures very little heat emission, the highly selective coating comprises a plurality of functional coats, the plurality of functional coats are applied using roller coaters, whereby the functional coating comprises an adhesion promoter coat or a primer coat and an absorbent coat based on a sol-gel basis containing nano-particles.

2. Method according to claim 1, wherein the thicknesses of individual functional coats are between 0.0005 and 0.02 mm.

3. Method according to claim 1, wherein several of the plurality of functional coats contain functional particles.

4. Method according to claim 1, wherein several of the plurality of functional coats are applied on a sol-gel basis.

5. Method according to claim 1, wherein the highly selective coating has at least partial flexible characteristics.

6. Absorber plate of a solar collector, the absorber plate comprising a highly selective coating for improvement of the absorptive properties, the highly selective coating is applied using the coil coating process and includes a plurality of functional coats, which have been applied by at least one roller coater, whereby the functional coats comprise an adhesion promoter coat or a primer coat and an absorbent coat based on a sol-gel basis containing nano-particles.

7. Absorber plate according to claim 6, wherein the absorber plate is comprised of aluminum or an aluminum alloy.

8. Absorber plate according to claim 6 wherein several of the plurality of functional coats include functional particles.

9. Absorber plate according to claim 6, wherein the thicknesses of individual functional coats are between 0.0005 and 0.02 mm.

10. Absorber plate according to claim 6, wherein several of the plurality of functional coats are applied on a sol-gel basis.

11. Absorber plate according to claim 6, wherein the absorber plate is provided with embossings before or after coating.

12. Absorber plate according to claim 6, wherein the plate is used for solar collectors, in particular for flat plate collectors.

13. Method according to claim 1, wherein the strip made of metal comprises aluminum or an aluminum alloy.

14. Method according claim 3, wherein the functional particles are selected from the group consisting of nano-particles, metal particles, metallic oxide particles, pigments, and combinations thereof.

15. Absorber plate according to claim 8, wherein the functional particles are selected from the group consisting of nano-particles, metal particles, metallic oxide particles, pigments, and combinations thereof.

* * * * *